(12) United States Patent
Kyung et al.

(10) Patent No.: US 9,794,469 B2
(45) Date of Patent: Oct. 17, 2017

(54) IMAGE SIGNAL PROCESSOR WITH IMAGE REPLACEMENT AND MOBILE COMPUTING DEVICE INCLUDING THE SAME

(71) Applicant: Samsung Electronics Co., Ltd., Suwon-si, Gyeonggi-do (KR)

(72) Inventors: Kyu Min Kyung, Seoul (KR); Seong Yeong Jeong, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/964,515

(22) Filed: Dec. 9, 2015

(65) Prior Publication Data

US 2016/0173750 A1     Jun. 16, 2016

(30) Foreign Application Priority Data

Dec. 11, 2014  (KR) .................. 10-2014-0178638

(51) Int. Cl.
*H04N 5/232* (2006.01)
*H04N 5/355* (2011.01)
*H04N 5/369* (2011.01)

(52) U.S. Cl.
CPC ..... *H04N 5/23212* (2013.01); *H04N 5/35554* (2013.01); *H04N 5/3696* (2013.01)

(58) Field of Classification Search
CPC .......... H04N 5/23212; H04N 5/35554; H04N 5/35563; H04N 5/35545; H04N 5/3696
See application file for complete search history.

(56) References Cited

U.S. PATENT DOCUMENTS

| | | | |
|---|---|---|---|
| 7,103,212 B2 | 9/2006 | Hager et al. | |
| 7,728,882 B2 | 6/2010 | Jaspers | |
| 7,830,431 B2 | 11/2010 | McCaffrey et al. | |
| 7,830,435 B2 | 11/2010 | Guidash | |
| 7,855,740 B2 | 12/2010 | Hamilton et al. | |
| 8,059,174 B2 | 11/2011 | Mann et al. | |
| 8,310,578 B2 | 11/2012 | Krymski | |
| 8,368,792 B2 | 2/2013 | Xu | |
| 8,405,750 B2 | 3/2013 | Smith et al. | |
| 8,502,895 B2 | 8/2013 | Yosefin | |
| 8,530,815 B2 | 9/2013 | Spears | |
| 9,288,382 B2 * | 3/2016 | Fujii ................. | H04N 5/347 |

(Continued)

*Primary Examiner* — Albert Cutler
(74) *Attorney, Agent, or Firm* — Renaissance IP Law Group LLP

(57) ABSTRACT

A system, comprising: an image sensor including: a first pixel including a first photoelectric conversion element of a first phase group and configured to have a first exposure and the second photoelectric conversion element of a second phase group and configured to have a second exposure; and a second pixel including a third photoelectric conversion element of the first phase group and configured to have the second exposure and a fourth photoelectric conversion element of the second phase group and configured to have the first exposure; and an image signal processor coupled to the image sensor and configured to: receive a first image from the image sensor; receive a second image from the image sensor; and configured to output an image based on at least one of the first image and the second image; wherein the first exposure is longer than the second exposure.

16 Claims, 10 Drawing Sheets

(56) References Cited

U.S. PATENT DOCUMENTS

| | | | | |
|---|---|---|---|---|
| 2012/0050583 A1* | 3/2012 | Watanabe | ............... | G06T 5/003 348/241 |
| 2015/0077603 A1* | 3/2015 | Matsuzawa | .............. | H04N 5/77 348/297 |
| 2015/0350583 A1* | 12/2015 | Mauritzson | ............ | H04N 5/378 250/208.1 |

\* cited by examiner

IMAGE SIGNAL PROCESSOR WITH IMAGE REPLACEMENT AND MOBILE COMPUTING DEVICE INCLUDING THE SAME

CROSS-REFERENCE TO RELATED APPLICATION

This application claims priority under 35 U.S.C. §119(a) from Korean Patent Application No. 10-2014-0178638 filed on Dec. 11, 2014, the disclosure of which is hereby incorporated by reference in its entirety.

BACKGROUND

Embodiments relate to an image signal processor, and more particularly, to an image signal processor for allowing multiple phase images output from an image sensor including pixels each including multiple photodiodes to replace or complement each other and a mobile computing device including the same.

In order to reduce a space occupied by a phase difference auto-focus module in a camera, a camera sensor includes pixels that can directly detect a phase difference. In conventional pixels for detecting a phase difference, a photodiode is partially shielded by a metal or the like and light only coming through an unshielded portion of the photodiode is detected.

Image sensors may include two or four photodiodes in each pixel so that the pixel directly detects a phase difference. An image output from such image sensors includes multiple phase images. Each of the phase images is generated using an image signal output from a photodiode included in a pixel. Disparity between the phase images may occur due to optical phenomena, which leads to the deterioration of the quality of images.

SUMMARY

An embodiment includes a system, comprising: an image sensor including: a first pixel including a first photoelectric conversion element of a first phase group and configured to have a first exposure and the second photoelectric conversion element of a second phase group and configured to have a second exposure; and a second pixel including a third photoelectric conversion element of the first phase group and configured to have the second exposure and a fourth photoelectric conversion element of the second phase group and configured to have the first exposure; and an image signal processor coupled to the image sensor and configured to: receive a first image including a signal from the first photoelectric conversion element of the image sensor; receive a second image including a signal from the second photoelectric conversion element of the image sensor; and configured to output an image based on at least one of the first image and the second image; wherein the first exposure is longer than the second exposure.

An embodiment includes a mobile computing device comprising: an image sensor comprising: a first pixel comprising a first photoelectric conversion element of a first phase group and configured to have a first exposure and a second photoelectric conversion element of a second phase group and configured to have a second exposure; and a second pixel comprising a third photoelectric conversion element of the first phase group and configured to have the second exposure and a fourth photoelectric conversion element of the second phase group and configured to have the first exposure; an image signal processor configured to receive a captured image comprising a first image generated at least in part by the first photoelectric conversion element and a second image generated at least in part by the second photoelectric conversion element from the image sensor; and an application processor configured to control an operation of the mobile computing device, wherein: the first exposure is longer than the second exposure; and the image signal processor is configured to output an output image based on the first image and the second image.

An embodiment includes an image signal processor, comprising: a replacement determination circuit configured to: receive a first phase image and a second phase image, each of the first phase image and the second phase image including a first part having a first exposure and a second part having a second exposure; and determine how to combine the first phase image and the second phase image based on at least one of the first phase image and the second phase image; and a replacement circuit coupled to the replacement determination circuit and configured to combine the first phase image and the second phase image in response to the replacement determination circuit; wherein the first exposure is longer than the second exposure.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EMBODIMENTS

Figure 1:
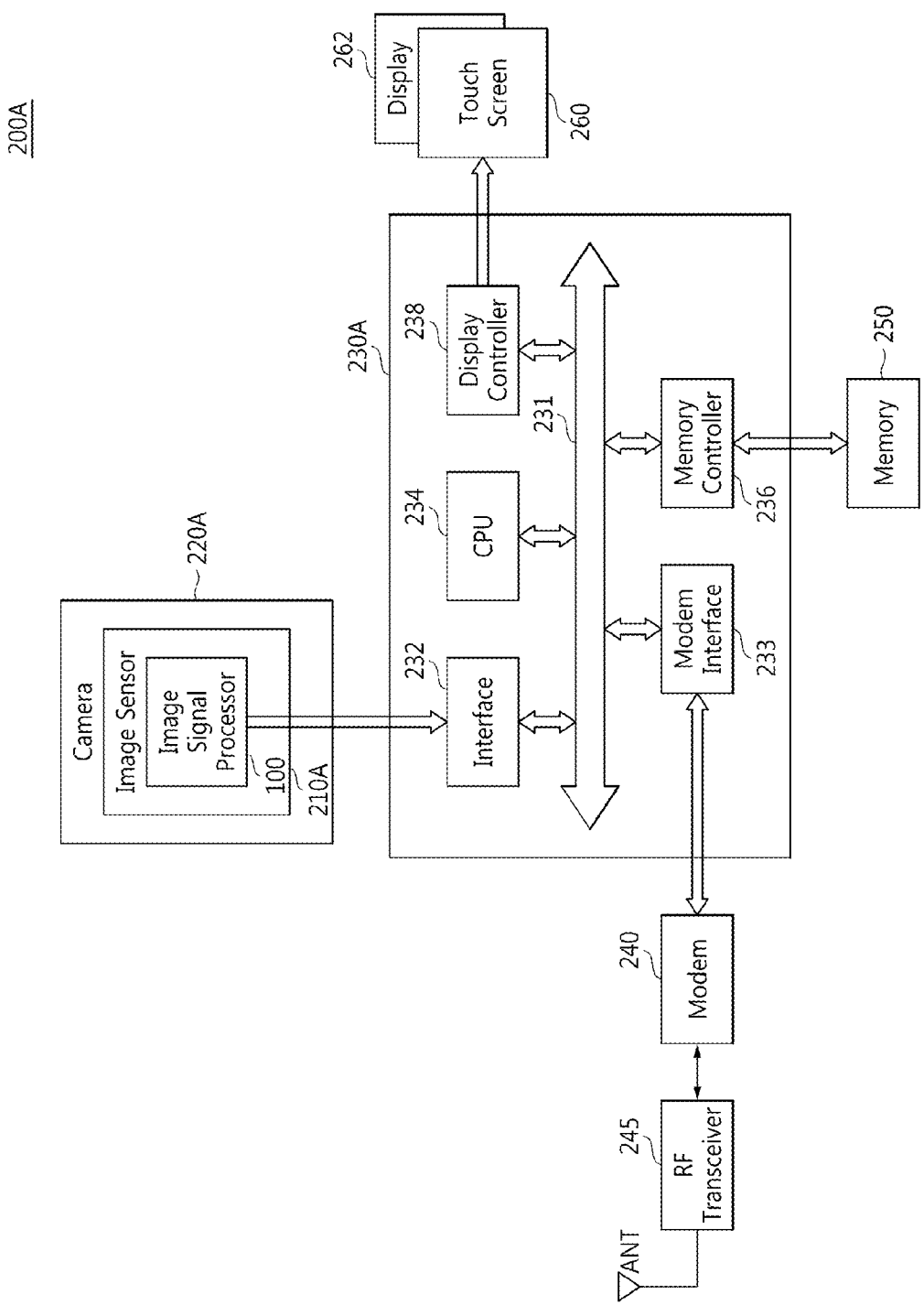
FIG. 1 is a block diagram of a computing device including an image signal processor according to some embodiments.

Embodiments will be described more fully hereinafter with reference to the accompanying drawings, in which particular embodiments are shown. Embodiments may, however, take many different forms and should not be construed as limited to the particular embodiments set forth herein. Rather, these embodiments are provided so that this disclosure will be thorough and complete, and will fully convey the scope to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a computing device 200A including an image signal processor 100 according to some embodiments. The computing device 200A may include a mobile computing device such as a laptop computer, a cellular phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, an e-book, or the like. The computing device 200A may include a camera 220A including an image sensor 210A, a controller 230A, a modem 240, a radio frequency (RF) transceiver 245, a memory 250, and a display 262 including a touch screen 260.

The image sensor 210A may be configured to convert an optical image into an electrical signal. The image sensor 210A may include an active pixel area in which multiple pixels is arranged in a matrix form. Each of the pixels may include multiple photoelectric conversion elements. The photoelectric conversion elements may include a first-phase long-exposure first photoelectric conversion element and a second-phase short-exposure second photoelectric conversion element.

The first photoelectric conversion element may be a photoelectric conversion element that has a first phase and a long exposure time. The second photoelectric conversion element may be a photoelectric conversion element that has a second phase and a short exposure time. The long exposure time and the short exposure time may be relative times and are may not be limited to any specific time.

Alternatively, the photoelectric conversion elements may include a first-phase short-exposure third photoelectric conversion element and a second-phase long-exposure fourth photoelectric conversion element. The structure of the image sensor 210A will be described in detail with reference to FIGS. 4 through 6C below.

The camera 220A may be configured to generate image data using the image sensor 210A. The image signal processor 100 may be configured to process the image data and output processed image data to the controller 230A. The image signal processor 100 may be configured to replace a first-phase long-exposure first image included in a first phase image and a second-phase short-exposure second image included in a second phase image with each other among multiple phase images included in the image data to process the image data.

The first-phase long-exposure first image is included in the first phase image and has a long exposure time. The first-phase long-exposure first image may be generated by the first photoelectric conversion element. The second-phase short-exposure second image is included in the second phase image and has a short exposure time. The second-phase short-exposure second image may be generated by the second photoelectric conversion element.

When replacing the first and second images with each other, the image signal processor 100 may be configured to detect a disparity between the first and second images and may replace them with each other using the detected disparity. The image signal processor 100 may also be configured to perform interpolation on each of the first and second phase images. Here, an image signal of a photoelectric conversion element having a long exposure time may be interpolated using image signals output from neighboring photoelectric conversion elements which have the same phase as the photoelectric conversion element and a short exposure time.

The RF transceiver 245 may be configured to transmit radio data received through an antenna ANT to the modem 240. The RF transceiver 245 may also be configured to convert data output from the modem 240 into radio data and output the radio data through the antenna ANT. The modem 240 may be configured to process data transferred between the RF transceiver 245 and the controller 230A.

The controller 230A may be configured to control the camera 220A, the modem 240, the RF transceiver 245, the memory 250, the touch screen 260, and/or the display 262. The controller 230A may be implemented as an integrated circuit (IC), a system on chip (SoC), an application processor (AP), a mobile AP, or the like. The controller 230A may include bus architecture 231, an interface 232, a modem interface 233, a central processing unit (CPU) 234, a memory controller 236, and a display controller 238.

The CPU 234 may be configured to control the interface 232, the modem interface 233, the memory controller 236, and the display controller 238 through the bus architecture 231. The bus architecture 231 may be implemented as advanced microcontroller bus architecture (AMBA®), an advanced high-performance bus (AHB), an advanced peripheral bus (APB), an advanced extensible interface (AXI), or an advanced system bus (ASB), but embodiments are not restricted to these examples.

The interface 232 may transmit image data from the image signal processor 100 to the bus architecture 231. The modem interface 233 may control processing and/or transmission of data communicated with the modem 240 according to the control of the CPU 234.

The memory controller 236 may be configured to control an access operation on the memory 250 according to the control of the CPU 234. The access operation may include a write operation for writing data to the memory 250 and a read operation for reading data from the memory 250.

The memory 250 may include either or both of volatile memory and non-volatile memory. Although one memory controller 236 and one memory 250 are illustrated in FIG. 1, the memory controller 236 may refer to a group of memory controllers for controlling different types of memory devices and the memory 250 may refer to a group of different types of memory devices. The memory 250 may be formed with dynamic random access memory (DRAM). Alternatively, the memory 250 may be formed with flash-based memory such as NAND-type flash memory, NOR-type flash memory, a multimedia card (MMC), an embedded MMC (eMMC), a universal flash storage (UFS), or the like. However, embodiments are not restricted to these examples.

The display controller 238 may be configured to transmit data to be displayed on the display 262 to the display 262 according to the control of the CPU 234. The display controller 238 and the display 262 may be configured to communicate data with each other using mobile industry processor interface (MIPI®) display serial interface, embedded DisplayPort, or the like.

The touch screen 260 may be configured to transmit a user input for controlling the operation of the computing device 200A to the controller 230A. The user input may be generated when a user touches the touch screen 260. The CPU 234 may be configured to control the operation of at least one among the camera 210, the controller 230A, the memory 250, and the display 262 according to the user input received from the touch screen 260.

Figure 2:
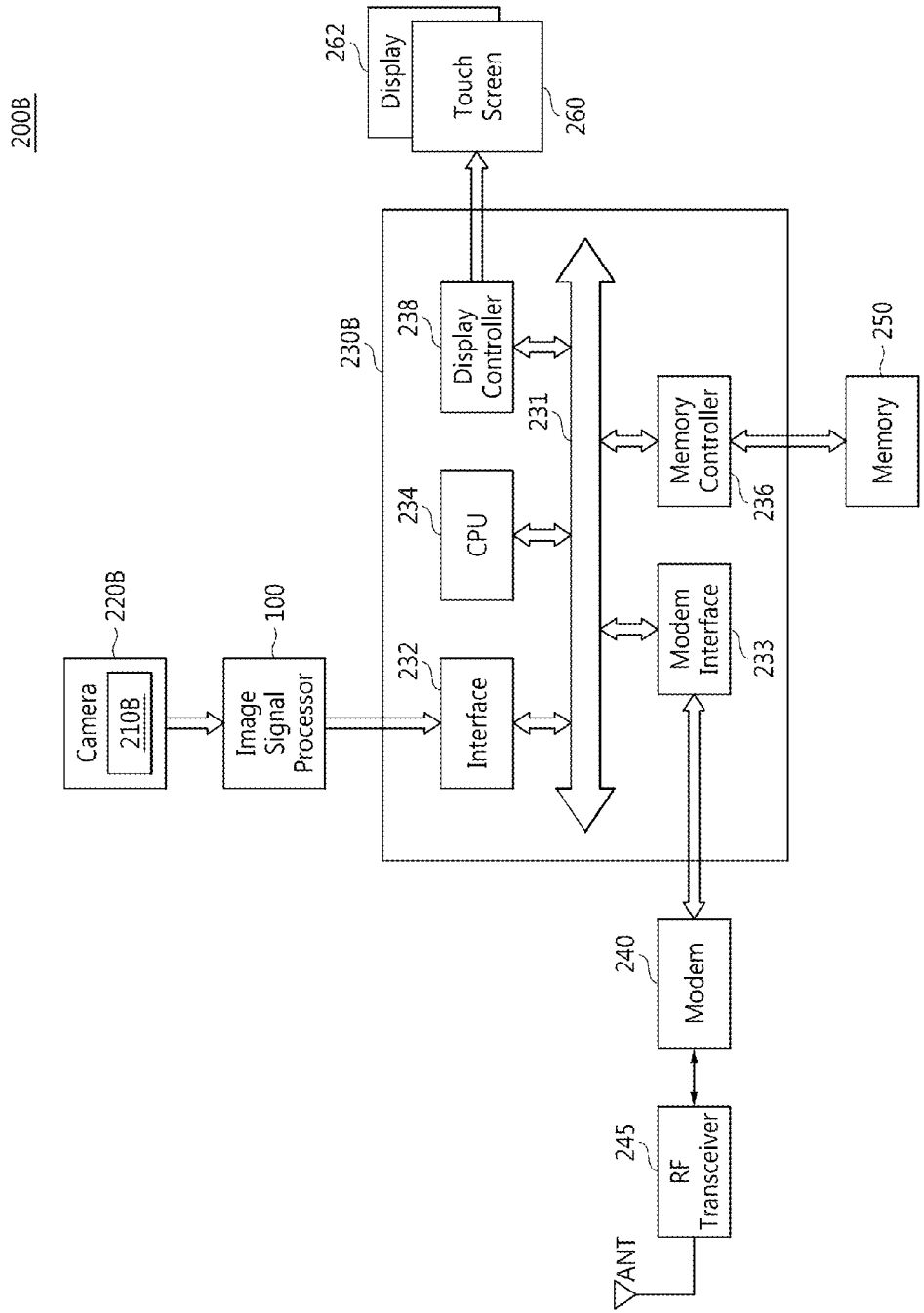
FIG. 2 is a block diagram of a computing device including an image signal processor according to other embodiments.

FIG. 2 is a block diagram of a computing device 200B including the image signal processor 100 according to other embodiments. Referring to FIGS. 1 and 2, the structure and operations of the computing device 200B illustrated in FIG. 2 are substantially the same as or similar to those of the computing device 200A illustrated in FIG. 1 except for the image signal processor 100, an image sensor 210B, and a camera 220B.

Referring to FIG. 2, the image signal processor 100 may be provided between the image sensor 210B and a controller 230B or between the camera 220B and the controller 230B. The image signal processor 100 may be configured to receive and process image data output from the image sensor 210B or the camera 220B and may be configured to output processed image data to the controller 230B. The structure and operations of the controller 230B may be substantially the same as or similar to those of the controller 230A illustrated in FIG. 1.

Figure 3:
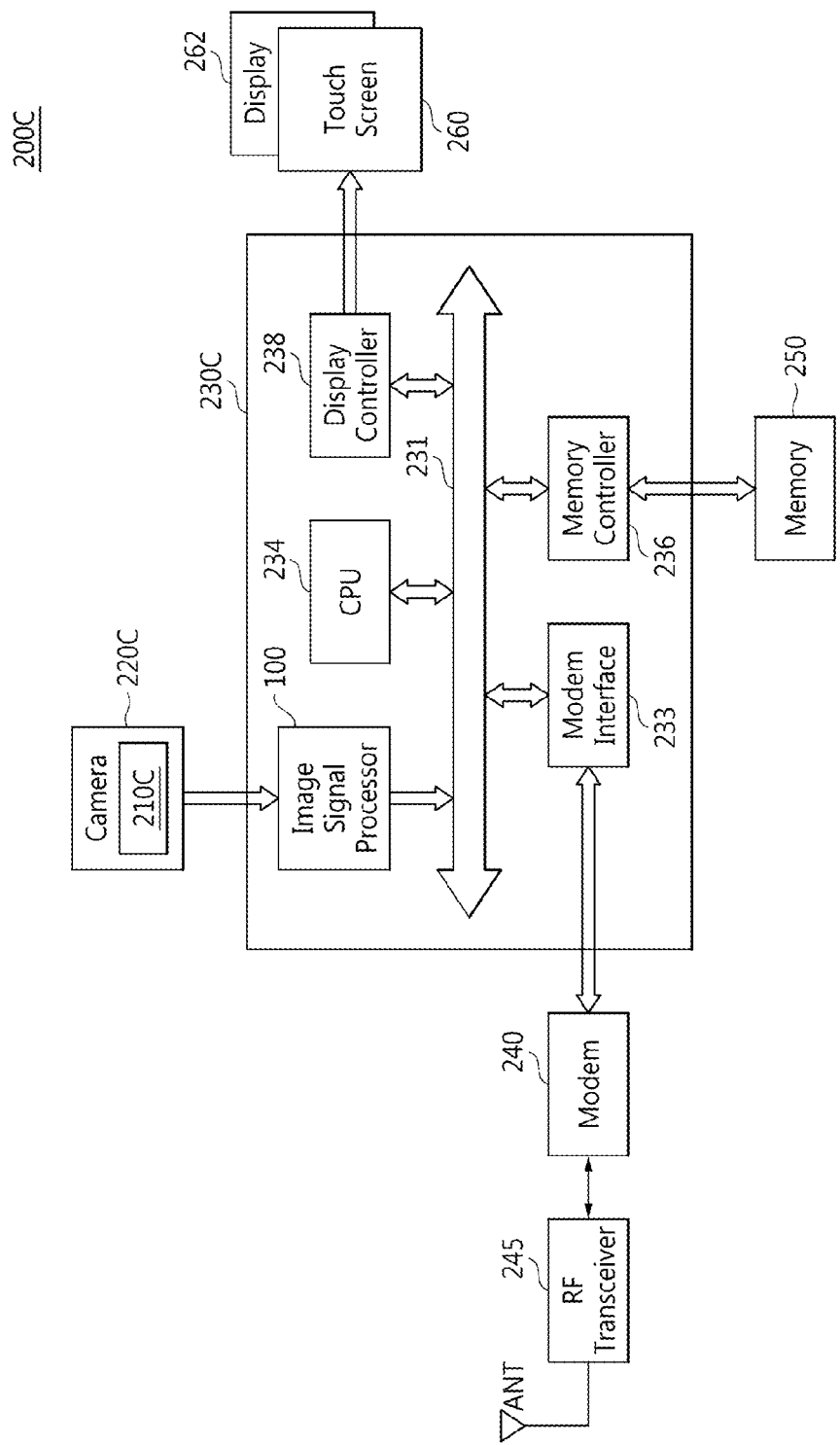
FIG. 3 is a block diagram of a computing device including an image signal processor according to further embodiments.

FIG. 3 is a block diagram of a computing device 200C including the image signal processor 100 according to further embodiments. Referring to FIGS. 2 and 3, the structure and operations of the computing device 200C including a controller 230C illustrated in FIG. 3 are substantially the same as or similar to those of the computing device 200B including the controller 230B illustrated in FIG. 2 except for the image signal processor 100 and the interface 232.

Referring to FIG. 3, the image signal processor 100 may be provided within the controller 230C. The image signal processor 100 may be configured to receive and process image data output from an image sensor 210C and may be configured to output processed image data to the bus architecture 231. The image sensor 210C and a camera 220C illustrated in FIG. 3 may be substantially the same as the image sensor 210B and the camera 220B illustrated in FIG. 2.

Figure 4:
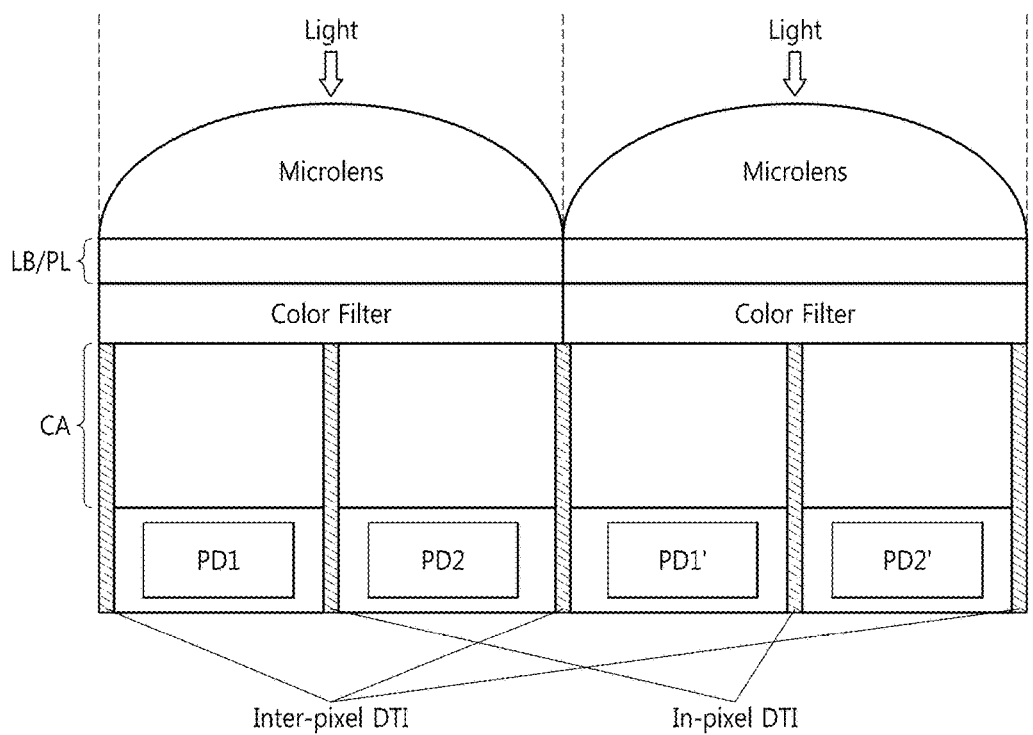
FIG. 4 is a cross-sectional view of pixels including two photodiodes in image sensors illustrated in FIGS. 1 through 3.

FIG. 4 is a cross-sectional view of pixels including two photodiodes PD1 and PD2 or PD1' and PD2'. These pixels may be used in the image sensors 210A through 210C illustrated in FIGS. 1 through 3. Each of the pixels may be a red pixel, a green pixel, or a blue pixel; however, in other embodiments, each pixel may be configured to sense different wavelength ranges, including non-visible wavelengths. Accordingly, although the description herein may address red, green, and blue pixels, and associated filters or other components, in other embodiments, different types of pixels may be used along with filters or other components associated with those types of pixels.

The photodiode PD1 or PD1' may be one of a photoelectric conversion element configured to generate a long-exposure image signal and a photoelectric conversion element configured to generate a short-exposure image signal. The photodiode PD2 or PD2' may be the other of a photoelectric conversion element configured to generate a long-exposure image signal and a photoelectric conversion element configured to generate a short-exposure image signal.

Two photoelectric conversion elements PD1 and PD2 or PD1' and PD2' may be formed in a silicon substrate and a deep trench isolation (DTI) may be formed between the photoelectric conversion elements PD1 and PD2 or PD1' and PD2'. An in-pixel DTI may be formed between the photoelectric conversion elements PD1 and PD2 or PD1' and PD2' and an inter-pixel DTI may be formed between the pixels.

Metal wiring, multi-layer wiring, or wiring layers may be formed in a circuit area CA between the photoelectric conversion elements PD1 and PD2 or PD1' and PD2' and a color filter. A lens buffer or a planarization layer LB/PL may be formed between a microlens and the color filter.

Figure 5:
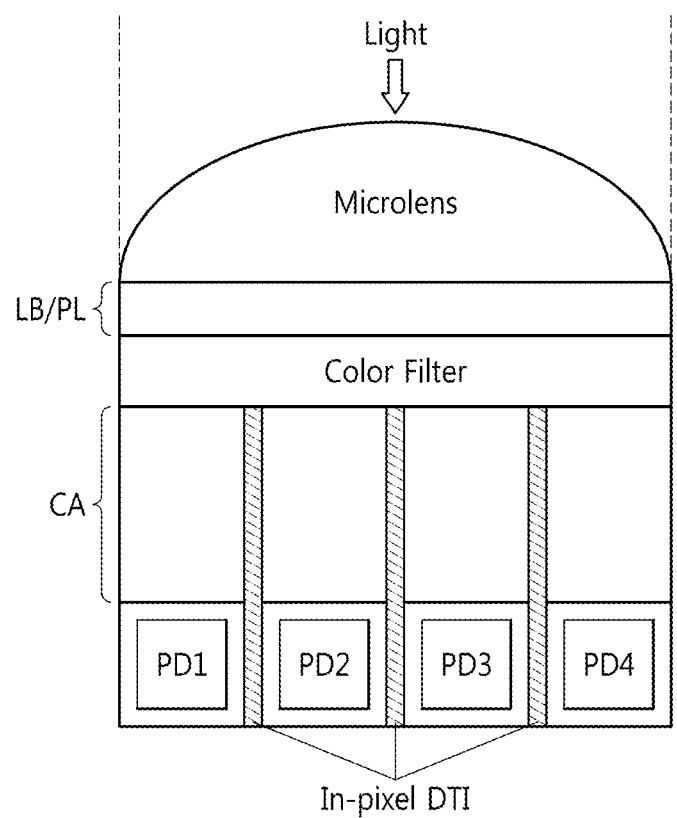
FIG. 5 is a cross-sectional view of a pixel including four photodiodes in the image sensors illustrated in FIGS. 1 through 3.

FIG. 5 is a cross-sectional view of a pixel including four photoelectric conversion elements PD1, PD2, PD3, and PD4. These pixels may be used in the image sensors 210A through 210C illustrated in FIGS. 1 through 3. Referring to FIG. 5, the photoelectric conversion elements PD1 through PD4 may be configured to generate image signals with different exposure times, but other embodiments are not restricted to this particular embodiment. The first and fourth photoelectric conversion elements PD1 and PD4 may be configured to generate long-exposure image signals and the second and third photoelectric conversion elements PD2 and PD3 may be configured to generate short-exposure image signals.

Four photoelectric conversion elements PD1 through PD4 may be formed in a silicon substrate and DTIs, i.e., in-pixel DTIs may be formed between the photoelectric conversion elements PD1 and PD2, PD2 and PD3, and PD3 and PD4, respectively. An inter-pixel DTI (not illustrated) may be formed between this pixel and other pixels. Metal wiring, multi-layer wiring, or wiring layers may be formed in a circuit area CA between the photoelectric conversion elements PD1 through PD4 and a color filter. A lens buffer or a planarization layer LB/PL may be formed between a microlens and the color filter.

Figure 6A:
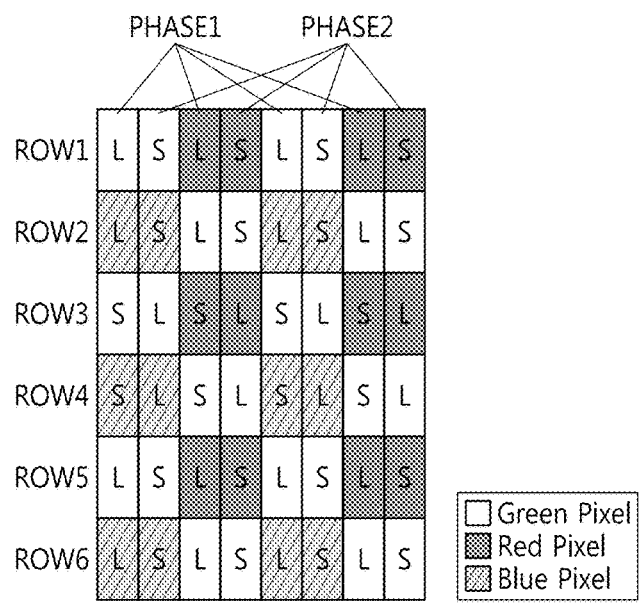
FIGS. 6A through 6C are diagrams of pixels divided into first phase pixels and second phase pixels in the image sensor illustrated in FIG. 4.
Figure 6B:
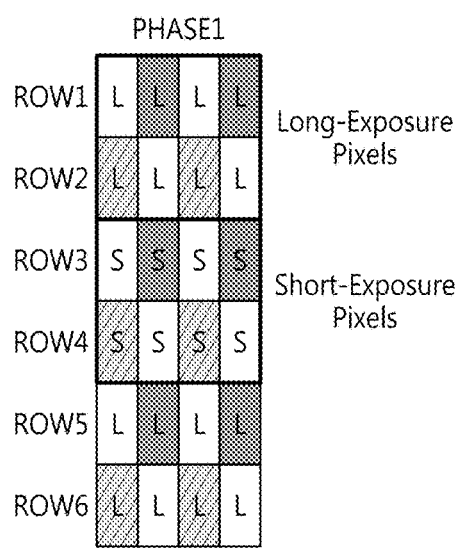
Figure 6C:
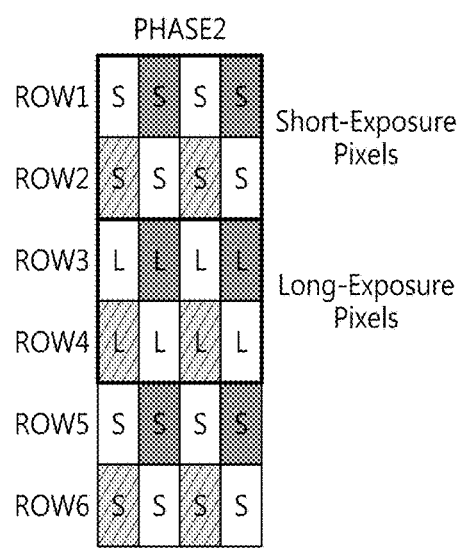

FIGS. 6A through 6C are diagrams of pixels divided into first phase pixels and second phase pixels. These pixels may be used in the image sensor 210A, 210B, 210C, or the like illustrated in FIG. 4. Referring to FIGS. 1 through 4 and FIGS. 6A through 6C, pixels included in the image sensor 210A, 210B, 210C, or the like may include two photoelectric conversion elements PD1 and PD2. Of these photoelectric conversion elements PD1 and PD2, the photoelectric conversion element PD1 that generates a long-exposure image signal is defined as a long-exposure photoelectric conversion element L and the photoelectric conversion element PD2 that generates a short-exposure image signal is defined as a short-exposure photoelectric conversion element S.

Referring to FIG. 6A, the pixels may be arranged so that the long-exposure photoelectric conversion element L and the short-exposure photoelectric conversion element S are positioned side by side. In other embodiments, the pixels may be arranged so that the long-exposure photoelectric conversion element L and the short-exposure photoelectric conversion element S are positioned above and below each other.

The pixels may be arranged in a matrix form. The long-exposure photoelectric conversion element L may be positioned on the left side and the short-exposure photoelectric conversion element S may be positioned on the right side in each of the pixels in first and second rows ROW1 and ROW2. In contrast, the short-exposure photoelectric conversion element S may be positioned on the left side and the long-exposure photoelectric conversion element L may be positioned on the right side in each of the pixels in third and fourth rows ROW3 and ROW4. In other words, the inner disposition of the pixels in the rows ROW1 and ROW2 may be opposite to that of the pixels in the rows ROW3 and ROW4.

The disposition of pixels in the image sensor 210A, 210B, 210C, or other similar image sensors illustrated in FIG. 6A is just an example. The disposition may vary with design specifications.

Photoelectric conversion elements in odd-numbered columns may correspond to a first phase group PHASE1 and photoelectric conversion elements in even-numbered columns may correspond to a second phase group PHASE2. FIGS. 6B and 6C show the first phase group PHASE1 and the second phase group PHASE2, respectively, in the pixel array shown in FIG. 6A.

Long-exposure photoelectric conversion elements L are included in the first and second rows ROW1 and ROW2 of the first phase group PHASE1 and short-exposure photoelectric conversion elements S are included in the third and fourth rows ROW3 and ROW4 of the first phase group PHASE1. Short-exposure photoelectric conversion elements S are included in the first and second rows ROW1 and ROW2 of the second phase group PHASE2 and long-exposure photoelectric conversion elements L are included in the third and fourth rows ROW3 and ROW4 of the second phase group PHASE2. Accordingly, there may be different photoelectric conversion elements at corresponding positions between the first phase group PHASE1 and the second phase group PHASE2.

The embodiments illustrated in FIGS. 6A through 6C are explained using an image sensor including pixels, each of which includes two photoelectric conversion elements as shown in FIG. 4. However, embodiments are not restricted to these embodiments and may be applied to an image sensor including N (where N is a natural number of at least 4) photoelectric conversion elements within a predictable range. For instance, when an image sensor includes pixels each of which includes four photoelectric conversion elements, the first phase group PHASE1 may be one of four phases and the second phase group PHASE2 may be another one of the four phases.

Although particular relationships of exposures and phase groups have been used as examples, the relationship between pixels, exposures, and phase groups may be different. For example, referring to FIGS. 5-6C, in an embodiment, photoelectric conversion element PD1 and PD4 may be configured to have a longer exposure while photoelectric conversion elements PD2 and PD3 may be configured to have a shorter exposure. Photoelectric conversion elements PD1 and PD3 may be part of a first phase group PHASE1 while photoelectric conversion elements PD2 and PD4 are part of a second phase group PHASE2. Accordingly, within a single pixel, up to all combinations of exposures and phase groups may be represented in different photoelectric conversion elements.

Figure 7:
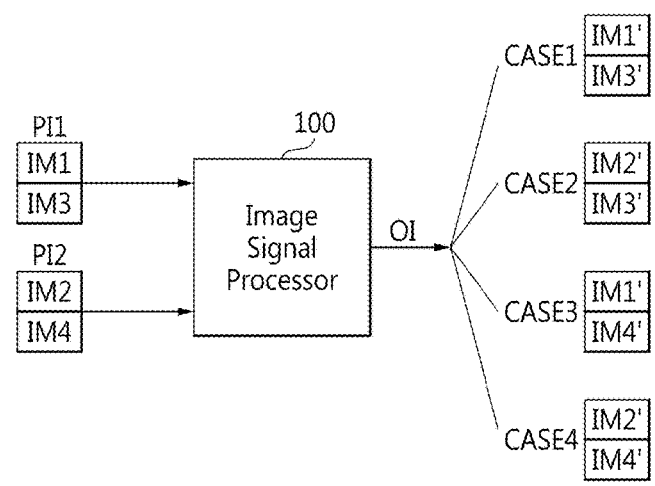
FIG. 7 is a conceptual diagram of the operation of an image signal processor according to some embodiments.

FIG. 7 is a conceptual diagram of the operation of the image signal processor 100 according to some embodiments. Referring to FIGS. 6A through 7, an image generated from the first phase group PHASE1 is referred to as a first phase image PI1 and an image generated from the second phase group PHASE2 is referred to as a second phase image PI2. The first phase image PI1 may include a first image IM1 and a third image IM3. The second phase image PI2 may include a second image IM2 and a fourth image IM4.

For instance, the first image IM1 may be generated from first-phase long-exposure first photoelectric conversion elements L included in the first and second rows ROW1 and ROW2 or similar rows of the first phase group PHASE1. The second image IM2 may be generated from second-phase short-exposure second photoelectric conversion elements S included in the first and second rows ROW1 and ROW2 or similar rows of the second phase group PHASE2. The third image IM3 may be generated from first-phase short-exposure third photoelectric conversion elements S included in the third and fourth rows ROW3 and ROW4 or similar rows of the first phase group PHASE1. The fourth image IM4 may be generated from second-phase long-exposure fourth photoelectric conversion elements L included in the third and fourth rows ROW3 and ROW4 or similar rows of the second phase group PHASE2.

Referring to FIGS. 1 through 4 and FIGS. 6A through 7, the image signal processor 100 may be configured to receive an image from the image sensor 210A, 210B, or 210C, may process the image, and may output a processed image OI. The image may include the first phase image PI1 and the second phase image PI2.

The image signal processor 100 may be configured to replace, complement, or both replace and complement the first image IM1 included in the first phase image PI1 and the second image IM2 included in the second phase image PI2 with each other. The image signal processor 100 may also be configured to replace, complement, or both replace and complement the third image IM3 included in the first phase image PI1 and the fourth image IM4 included in the second phase image PI2 with each other. The processed image OI output from the image signal processor 100 may fall under one of first through fourth cases CASE1 through CASE4 illustrated in FIG. 7.

Figure 8:
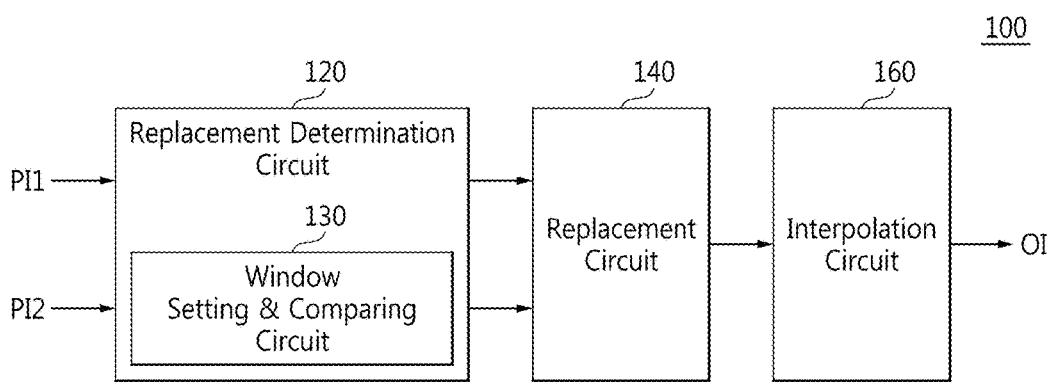
FIG. 8 is a schematic block diagram of an image signal processor according to some embodiments.

FIG. 8 is a schematic block diagram of the image signal processor 100 according to some embodiments. Referring to FIGS. 1 through 3 and FIGS. 6A through 8, the image signal processor 100 may include a replacement determination circuit 120, a replacement circuit 140, and an interpolation circuit 160.

The replacement determination circuit 120 may be configured to determine whether to replace the first image IM1 with a second image IM2'. The second image IM2' corresponds to the second image IM2 that has been processed by the image signal processor 100. The replacement determination circuit 120 may also determine whether to replace the second image IM2 with a first image IM1'. The first image IM1' corresponds to the first image IM1 that has been processed by the image signal processor 100.

The replacement determination circuit 120 may be configured to determine whether to replace the third image IM3 with a fourth image IM4'. The fourth image IM4' corresponds to the fourth image IM4 that has been processed by the image signal processor 100. The replacement determination circuit 120 may also be configured to determine whether to replace the fourth image IM4 with a third image IM3'. The third image IM3' corresponds to the third image IM3 that has been processed by the image signal processor 100.

As shown in the first case CASE1 illustrated in FIG. 7, the image signal processor 100 may be configured to process the original images IM1 and IM3 without replacing the image IM1 and IM3 and may be configured to generate the processed image OI including the processed images IM1' and IM3'. As shown in the second case CASE2, the image signal processor 100 may be configured to replace the first image IM1 with the second image IM2, process the second image IM2 and the third image IM3, and may be configured to generate the processed image OI including the processed images IM2' and IM3'.

As shown in the third case CASE3, the image signal processor 100 may be configured to replace the third image IM3 with the fourth image IM4, process the fourth image IM4 and the first image IM1, and may be configured to generate the processed image OI including the processed images IM1' and IM4'. As shown in the fourth case CASE4, the image signal processor 100 may be configured to replace the first image IM1 with the second image IM2 and third image IM3 with the fourth image IM4, process the second image IM2 and the fourth image IM4, and may be configured to generate the processed image OI including the processed images IM2' and IM4'.

When information about an image (e.g., at least one image between the first image IM1 and the fourth image IM4) generated from the long-exposure photoelectric conversion elements L is lost as the long-exposure photoelectric conversion elements L are saturated under conditions of high illumination, the replacement determination circuit 120 may be configured to drive the replacement circuit 140 to replace the at least one image between the first image IM1 and the fourth image IM4 with an image (e.g., at least one image between the second image IM2 and the third image IM3) generated from corresponding short-exposure photoelectric conversion elements S. When the saturation of the long-exposure photoelectric conversion elements L is higher than a reference saturation, the replacement determination circuit 120 may be configured to determine that the long-exposure photoelectric conversion elements L have been saturated, but embodiments are not restricted to these examples. The conditions of high illumination may be formed by light emitted from the sun, but embodiments are not restricted to this example.

When the signal-to-noise ratio (SNR) of image signals (e.g., image signals constituting the at least one image between the second image IM2 and the third image IM3) output from the short-exposure photoelectric conversion elements S is lower than a reference SNR as the short-exposure photoelectric conversion elements S do not receive the satisfactory amount of light under conditions of low illumination, the replacement determination circuit 120 may be configured to drive the replacement circuit 140 to replace the at least one image between the second image IM2 and the third image IM3 with an image (e.g., at least one image between the first image IM1 and the fourth image IM4) generated from corresponding long-exposure photoelectric conversion elements L. The conditions of low illumination may be formed at night or by shades, but embodiments are not restricted to these examples.

The replacement determination circuit 120 may include a window setting and comparing circuit 130. The window setting and comparing circuit 130 may be configured to detect disparity between the first phase image PI1 and the second phase image PI2 and the replacement circuit 140 may use the disparity when performing replacement. The window setting and comparing circuit 130 may be configured to perform the detection of disparity regardless of the determination made by the replacement determination circuit 120 about whether to perform replacement or not. The operation of the window setting and comparing circuit 130 will be described in detail with reference to FIG. 9 later.

The replacement circuit 140 may be configured to replace the first image IM1 with the second image IM2 or the third image IM3 with the fourth image IM4 according to the determination made by the replacement determination circuit 120 about whether to perform replacement or not.

The interpolation circuit 160 may be configured to interpolate a signal output from one of photoelectric conversion elements included in either the first phase group PHASE1 or the second phase group PHASE2 using signals output from neighboring photoelectric conversion elements of the one photoelectric conversion element when a correlation score calculated by the window setting and comparing circuit 130 during the detection of disparity is lower than a reference correlation score. Accordingly, a signal output from the one photoelectric conversion element can be estimated.

Figure 9:
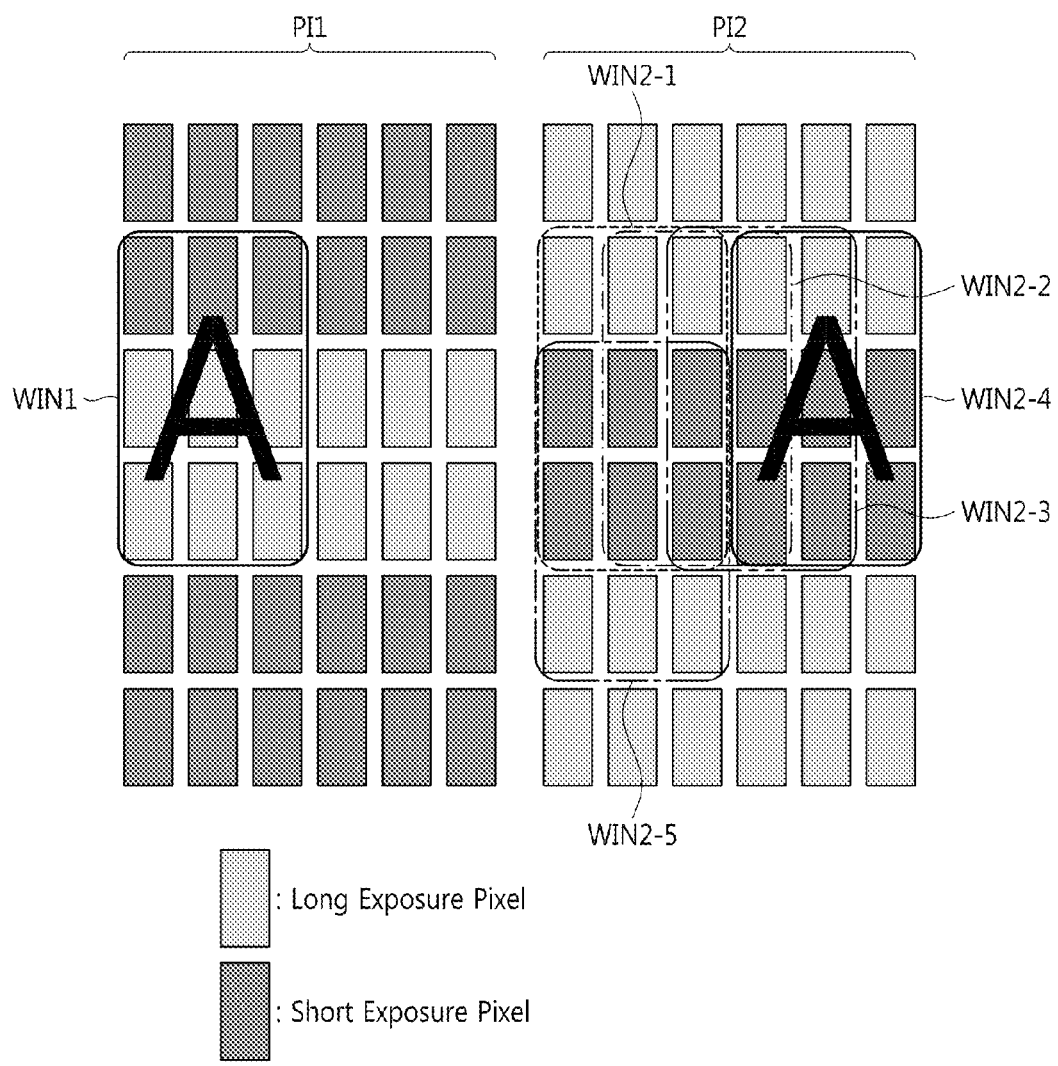
FIG. 9 is a diagram for explaining the operation of a window setting and comparing circuit illustrated in FIG. 8.

FIG. 9 is a diagram for explaining the operation of the window setting and comparing circuit 130 illustrated in FIG. 8. Referring to FIGS. 6A through 9, a photoelectric conversion element (e.g., a first photoelectric conversion element) which is included in the first phase group PHASE1 and a photoelectric conversion element (e.g., a second photoelectric conversion element) which is included in the second phase group PHASE2 are included in one pixel, i.e., the first pixel in the image sensor 210A, 210B, 210C, or other image sensors according to other embodiments. Accordingly, a shape formed in the first phase image PI1 generated from the first phase group PHASE1 and a shape formed in the second phase image PI2 generated from the second phase group PHASE2 may coincide with each other when the focus is right.

However, when the focus is not right, the shape formed in the first phase image PI1 and the shape formed in the second phase image PI2 may not coincide with each other because of an optical phenomena. In other words, a disparity may occur between the first phase image PI1 and the second phase image PI2. At this time, the window setting and comparing circuit 130 may set a first window WIN1 within the first phase image PI1 and a second window WIN2 having the same size as the first window WIN1 within the second phase image PI2. Although the first window WIN1 is fixed and the second window WIN2 is moved in the embodiments illustrated in FIG. 9, the second window WIN2 may be fixed while the first window WIN1 is moved in other embodiments.

The window setting and comparing circuit 130 may be configured to move the second window WIN2 within the second phase image PI2 and may calculate a correlation score between the first window WIN1 and each of moving windows WIN2-1 through WIN2-4. The window setting and comparing circuit 130 may be configured to detect the second window (e.g., WIN2-4) whose correlation score with the first window WIN1 is a maximum according to the result of the calculation and may calculate a coordinate (or position) difference between the first window WIN1 and the second window WIN2-4 giving the maximum correlation score. The window setting and comparing circuit 130 may be configured to detect the disparity between the first phase image PI1 and the second phase image PI2 as the calculation result.

The replacement circuit 140 may be configured to perform replacement using the disparity. When the window setting and comparing circuit 130 detects a disparity of three pixels in the embodiments illustrated in FIG. 9, the replacement circuit 140 may be configured to replace the first image IM1 with the second image IM2' that has been moved by three pixels when performing replacement, for example, of the first image IM1 with the second image IM2.

Although a window moving in a first direction has been used as an example, as represented by second windows WIN2-1 to WIN2-4, in other embodiments, windows moved in other directions may be used instead or in addition to such windows. For example, a second window WIN2-5 or other similar windows offset in a different direction or directions may be used by the window setting and comparing circuit 130 and the replacement circuit 140.

Figure 10:
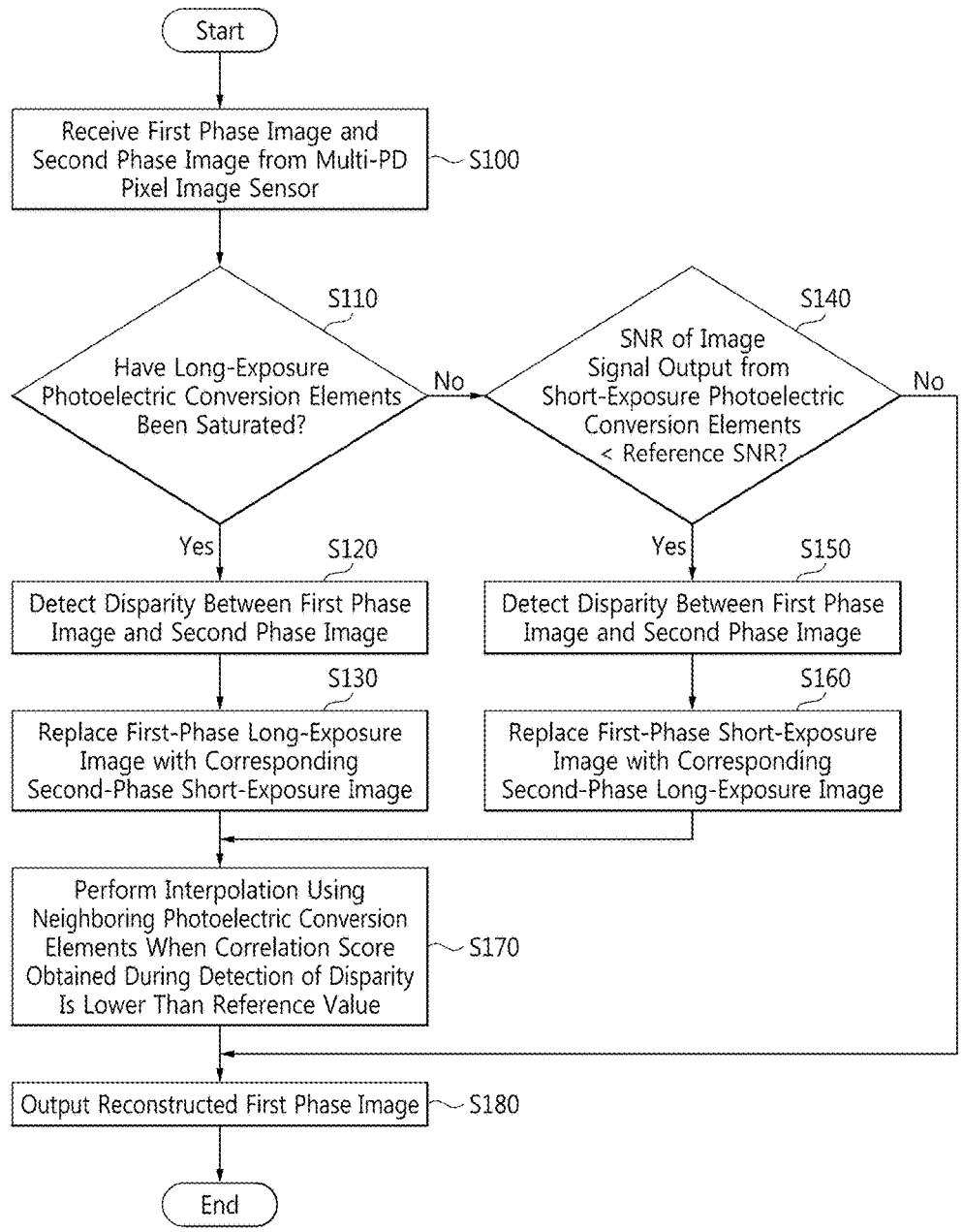
FIG. 10 is a flowchart of a method of operating an image signal processor according to some embodiments.

FIG. 10 is a flowchart of a method of operating the image signal processor 100 according to some embodiments. In the description of the embodiments illustrated in FIG. 10, a multi-photodiode (PD) pixel image sensor refers to the image sensor 210A, 210B, 210C, or other image sensors according to a variety of embodiments which include multiple photoelectric conversion elements in each pixel, as shown in FIGS. 1 through 5 or in other embodiments. Although the image signal processor 100 may replace an image (i.e., the first or third image IM1 or IM3) included in the first phase image PI1 with an image (i.e., the second or fourth image IM2 or IM4) included in the second phase image PI2 in the embodiments illustrated in FIG. 10, the image signal processor 100 may replace an image included in the second phase image PI2 with an image included in the first phase image PI1 in other embodiments.

Referring to FIGS. 1 through 10, the image signal processor 100 may receive a captured image including the first phase image PI1 and the second phase image PI2 from the multi-PD pixel image sensor 210A, 210B, 210C, or other image sensors according to a variety of embodiments in operation S100. The replacement determination circuit 120 included in the image signal processor 100 may determine whether first-phase long-exposure first photoelectric conversion elements L included in the first phase image PI1 have been saturated in operation S110.

When the first-phase long-exposure first photoelectric conversion elements L have been saturated (i.e., in case of high illumination), the window setting and comparing circuit 130 included in the replacement determination circuit 120 may detect a disparity between the first phase image PI1 and the second phase image PI2 in operation S120. The replacement circuit 140 may replace a first-phase long-exposure image (e.g., the first image IM1) with a corresponding second-phase short-exposure image (e.g., the second image IM2) using the disparity in operation S130.

In S140, a determination is made whether the SNR of an image signal output from the first-phase short-exposure second photoelectric conversion elements S is lower than a reference SNR (such as in case of low illumination). If so, the window setting and comparing circuit 130 may detect a disparity between the first phase image PI1 and the second phase image PI2 in operation S150. The replacement circuit 140 may replace a first-phase short-exposure image (e.g., the third image IM3) with a corresponding second-phase long-exposure image (e.g., the fourth image IM4) using the disparity in operation S160.

In other embodiments, operation S120 or S150 may be performed even when the first-phase long-exposure first photoelectric conversion elements L have not been saturated and the SNR of the image signal output from the first-phase short-exposure second photoelectric conversion elements S is not lower than the reference SNR.

When a correlation score calculated by the window setting and comparing circuit 130 during the detection of the disparity is lower than a reference correlation score, the interpolation circuit 160 may perform interpolation on the first phase image PI1 that has been subjected to the replacement in operation S170. The image signal processor 100 may output a first phase image reconstructed through either or both of the replacement and the interpolation in operation S180.

Figure 11:
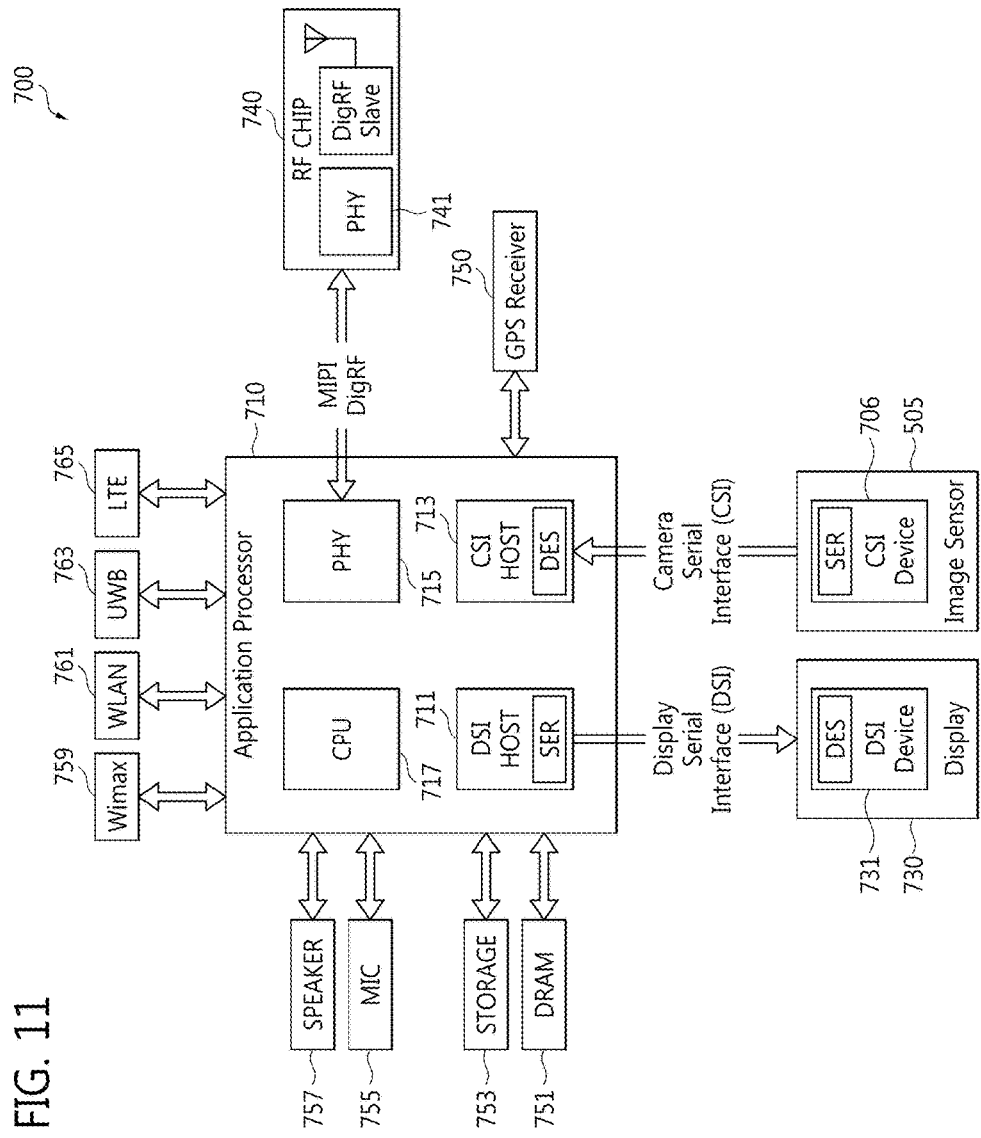
FIG. 11 is a block diagram of an image processing system including an image signal processor according to some embodiments.

FIG. 11 is a block diagram of an image processing system 700 including an image signal processor according to some embodiments. Referring to FIGS. 1 through 11, the image processing system 700 may be configured to use or support mobile industry processor interface (MIPI®) or other interfaces. The image processing system 700 may be implemented as a portable electronic device. The portable electronic device may refer to a mobile computing device such as a laptop computer, a cellular phone, a smart phone, a tablet PC, a digital camera, a camcorder, a MID (Mobile Internet Device), a wearable computer, an IoT (Internet of Things) device, or an IoE (Internet of Everything) device. The image processing system 700 may include an application processor (AP) 710, an image sensor 505, and a display 730.

A camera serial interface (CSI) host 713 included in the AP 710 may perform serial communication with a CSI device 706 in the image sensor 505 through CSI. A deserializer DES and a serializer SER may be included in the CSI host 713 and the CSI device 706, respectively. The image sensor 505 may be one of the image sensors 210A, 210B, and 210C respectively illustrated FIGS. 1 through 3 or image sensors according to a variety of other embodiments. As described above with reference to FIGS. 1 through 6C, the image sensor 505 may include multiple pixels or active pixel sensors. Each of the pixels may have a different exposure time and may include multiple photoelectric conversion elements controlled independently. The structure of each pixel has been described above with reference to FIGS. 4 and 5. The image sensor 505 may be implemented as a front side illuminated (FSI) complementary metal oxide semiconductor (CMOS) image sensor, a back side illuminated (BSI) CMOS image sensor, or other similar image sensors.

A display serial interface (DSI) host 711 included in the AP 710 may be configured to perform serial communication with a DSI device 731 included in the display 730 through DSI. A serializer SER and a deserializer DES may be included in the DSI host 711 and the DSI device 731, respectively. Image data output from the image sensor 505 may be transmitted to the AP 710 through CSI. The AP 710 may be configured to process the image data and transmit processed image data to the display 730 through DSI.

The image processing system 700 may also include an RF chip 740 configured to communicate with the AP 710. A physical layer (PHY) 715 of the AP 710 and a PHY 741 of the RF chip 740 may be configured to communicate data with each other according to MIPI DigRF.

A CPU 717 may be configured to control the operations of the DSI host 711, the CSI host 713, and the PHY 715. The CPU 717 may include at least one core. The AP 710 may be implemented in an IC or a SoC. The AP 510 may be a processor or a host that can control the operations of the image sensor 505.

Referring to FIGS. 1 through 3 and FIG. 11, the image sensor 505 or the AP 710 may include the image signal processor 100 according to some embodiments. The image signal processor 100 may be implemented in a separate chip in other embodiments.

The image processing system 700 may further include at least one of a global positioning system (GPS) receiver 750, a volatile memory 751 such as DRAM, a data storage 753 including non-volatile memory such as flash-based memory, a microphone (MIC) 755, and a speaker 757. The data storage 753 may be implemented as an external memory detachable from the AP 710. The data storage 753 may also be implemented as UFS, MMC, eMMC, memory card, or the like.

The image processing system 700 may be configured to communicate with external devices using at least one protocol among communication protocols such as worldwide interoperability for microwave access (WiMAX) 759, wireless local area network (WLAN) 761, ultra-wideband (UWB) 763, and long term evolution (LTE™) 765. In other embodiments, the image processing system 700 may also include at least one module among a near field communication (NFC) module, a WiFi module, and a Bluetooth module.

As described above, according to some embodiments, an image signal processor replaces or complements multiple phase images included in a captured image generated from an image sensor, which includes pixels each including multiple photodiodes, with each other, thereby increasing the sharpness and the SNR of the captured image. In addition, the image signal processor detects disparity between the phase images and complements them with each other according to the detection result, thereby increasing the sharpness of the captured image.

Some embodiments include an image signal processor. The image signal processor configured to receive a first image generated by a first photoelectric conversion element and a second image generated by a second photoelectric conversion element from an image sensor, which includes a first pixel including the first photoelectric conversion element having a first phase and a long exposure and the second photoelectric conversion element having a second phase and a short exposure and a second pixel including a third photoelectric conversion element having the first phase and the short exposure and a fourth photoelectric conversion element having the second phase and the long exposure, and replace the first image and the second image with each other.

The image signal processor may replace the first image with the second image when a saturation of the first photoelectric conversion element is higher than a reference saturation. The image signal processor may replace the second image with the first image when a signal-to-noise ratio (SNR) of an image signal output from the second photoelectric conversion element is lower than a reference SNR.

The image signal processor may receive a first phase image and a second phase image from the image sensor. The first phase image may include the first image and a third image generated by the third photoelectric conversion element. The second phase image may include the second image and a fourth image generated by the fourth photoelectric conversion element.

The image signal processor may set a first window within the first phase image and a second window having the same size as the first window within the second phase image, may move the second window within the second phase image, may detect a third window corresponding to the second window that has been moved and has a maximum correlation score with respect to the first window, may detect a disparity between the first phase image including the first window and the second phase image including the third window, and may replace the first image with the second image using the disparity.

When the correlation score is lower than a reference correlation score, the image signal processor may interpolate an image signal related with the first photoelectric conversion element generating the first phase image using image signals output from photoelectric conversion elements, including the third photoelectric conversion element, which are adjacent to the first photoelectric conversion element.

Other embodiments include a mobile computing device including an image sensor including a first pixel which includes a first photoelectric conversion element having a first phase and a long exposure and a second photoelectric conversion element having a second phase and a short exposure and a second pixel which includes a third photoelectric conversion element having the first phase and the short exposure and a fourth photoelectric conversion element having the second phase and the long exposure; an image signal processor configured to receive a captured image including a first image generated by the first photoelectric conversion element and a second image generated by the second photoelectric conversion element from the image sensor; and an application processor configured to control an operation of the mobile computing device. The image signal processor may replace the first image and the second image with each other.

The captured image may include a first phase image including the first image and a second phase image including the second image. The image signal processor may set a first window within the first phase image and a second window having the same size as the first window within the second phase image, may move the second window within the second phase image, may detect a third window corresponding to the second window that has been moved and has a maximum correlation score with respect to the first window, may detect a disparity between the first phase image including the first window and the second phase image including the third window, and may replace the first image with the second image using the disparity. The image signal processor may be implemented within the image sensor. As an alternative, the image signal processor may be implemented in a separate chip between the image sensor and the application processor. As another alternative, the image signal processor may be implemented within the application processor.

While embodiments have been particularly shown and described with reference to particular embodiments thereof, it will be understood by those of ordinary skill in the art that various changes in forms and details may be made therein without departing from the spirit and scope as defined by the following claims.

What is claimed is:

1. A system, comprising:
an image sensor including:
a first pixel including a first photoelectric conversion element of a first phase group and configured to have a first exposure and a second photoelectric conversion element of a second phase group and configured to have a second exposure; and
a second pixel including a third photoelectric conversion element of the first phase group and configured to have the second exposure and a fourth photoelectric conversion element of the second phase group and configured to have the first exposure; and
an image signal processor coupled to the image sensor and configured to:
receive a first image including a signal from the first photoelectric conversion element of the image sensor;
receive a second image including a signal from the second photoelectric conversion element of the image sensor;
output an output-by replacing one of the first image and the second image with the other of the first image and the second image;
receive a first phase image and a second phase image from the image sensor, the first phase image comprising the first image and a third image generated by the third photoelectric conversion element, the second phase image comprising the second image and a fourth image generated by the fourth photoelectric conversion element;
generate a first correlation between a first window within the first phase image and a second window having the same size as the first window within the second phase image;
generate a second correlation between the first window within the first phase image and a third window having the same size as the first window within the second phase image;
replace the first image with the second image based on the first correlation and the second correlation; and
wherein the first exposure is longer than the second exposure.

2. The system of claim 1, wherein the image signal processor is configured to replace the first image with the second image when a saturation of the first photoelectric conversion element is higher than a reference saturation.

3. The system of claim 1, wherein the image signal processor is configured to replace the second image with the first image when a signal-to-noise ratio (SNR) of an image signal output from the second photoelectric conversion element is lower than a reference SNR.

4. The system of claim 1, the image signal processor is further configured to interpolate between an image signal associated with the first photoelectric conversion element and an image signal associated with the third photoelectric conversion element adjacent to the first photoelectric conversion element in response to at least one of the first correlation and the second correlation.

5. A mobile computing device comprising:
an image sensor comprising:
a first pixel comprising a first photoelectric conversion element of a first phase group and configured to have a first exposure and a second photoelectric conversion element of a second phase group and configured to have a second exposure; and
a second pixel comprising a third photoelectric conversion element of the first phase group and configured to have the second exposure and a fourth photoelectric conversion element of the second phase group and configured to have the first exposure;
an image signal processor configured to receive a captured image comprising a first image generated at least in part by the first photoelectric conversion element and a second image generated at least in part by the second photoelectric conversion element from the image sensor; and
an application processor configured to control an operation of the mobile computing device,
wherein:
the first exposure is longer than the second exposure; and
the image signal processor is configured to output an output image by replacing one of the first image and the second image with the other of the first image and the second image,
wherein the captured image comprises a first phase image comprising the first image and a second phase image comprising the second image; and
the image signal processor is further configured to:
generate a first correlation between a first window within the first phase image and a second window having the same size as the first window within the second phase image;
generate a second correlation between the first window within the first phase image and a third window having the same size as the first window within the second phase image; and
replace the first image with the second image based on the first correlation and the second correlation.

6. The mobile computing device of claim 5, wherein the image signal processor is further configured to interpolate between an image signal associated with the first photoelectric conversion element and an image signal associated with the third photoelectric conversion element adjacent to the first photoelectric conversion element in response to at least one of the first correlation and the second correlation.

7. The mobile computing device of claim 5, wherein the first phase image further comprises a third image generated at least in part by the third photoelectric conversion element and the second phase image further comprises a fourth image generated at least in part by the fourth photoelectric conversion element.

8. The mobile computing device of claim 5, wherein the image signal processor is further configured to replace the first image with the second image when a saturation of the first photoelectric conversion element is higher than a reference saturation.

9. The mobile computing device of claim 5, wherein the image signal processor is further configured to replace the second image with the first image when a signal-to-noise ratio (SNR) of an image signal output from the second photoelectric conversion element is lower than a reference SNR.

10. The mobile computing device of claim 5, wherein the image signal processor is implemented within the image sensor.

11. The mobile computing device of claim 5, wherein the image signal processor is implemented separate from the image sensor and the application processor.

12. The mobile computing device of claim 5, wherein the image signal processor is implemented within the application processor.

13. An image sensor, comprising:
- a first pixel in a first group of rows in a pixel array including a first photoelectric conversion element of a first phase group and configured to have a first exposure and a second photoelectric conversion element of a second phase group and configured to have a second exposure; and
- a second pixel in a second group of rows in the pixel array including a third photoelectric conversion element of the first phase group and configured to have the second exposure and a fourth photoelectric conversion element of the second phase group and configured to have the first exposure;
- an image signal processor coupled to the first pixel and the second pixel and configured to:
  - receive a first image including a signal from the first photoelectric conversion element;
  - receive a second image including a signal from the second photoelectric conversion element; and
  - output an output image by replacing one of the first image with the second image with the other of the first image and the second image;
  - receive a first phase image and a second phase image from the image sensor, the first phase image comprising the first image and a third image generated by the third photoelectric conversion element, the second phase image comprising the second image and a fourth image generated by the fourth photoelectric conversion element;
  - generate a first correlation between a first window within the first phase image and a second window having the same size as the first window within the second phase image;
  - generate a second correlation between the first window within the first phase image and a third window having the same size as the first window within the second phase image;
  - replace the first image with the second image based on the first correlation and the second correlation; and
- wherein the first exposure is longer than the second exposure and the first group of rows are adjacent to the second group of rows.

14. The image sensor of claim 13, wherein photoelectric conversion elements of the first phase group are interleaved with photoelectric conversion elements of the second phase group.

15. The image sensor of claim 13, wherein the first pixel further comprises a fifth photoelectric conversion element of the first phase group and configured to have the second exposure and a sixth photoelectric conversion element of the second phase group and configured to have the first exposure.

16. The image sensor of claim 13, further comprising:
- a first color filter configured to filter light incident on the first pixel;
- a second color filter configured to filter light incident on the second pixel;
- wherein the first color filter is configured to filter a wavelength range different from the second color filter.

* * * * *